Figure 1:
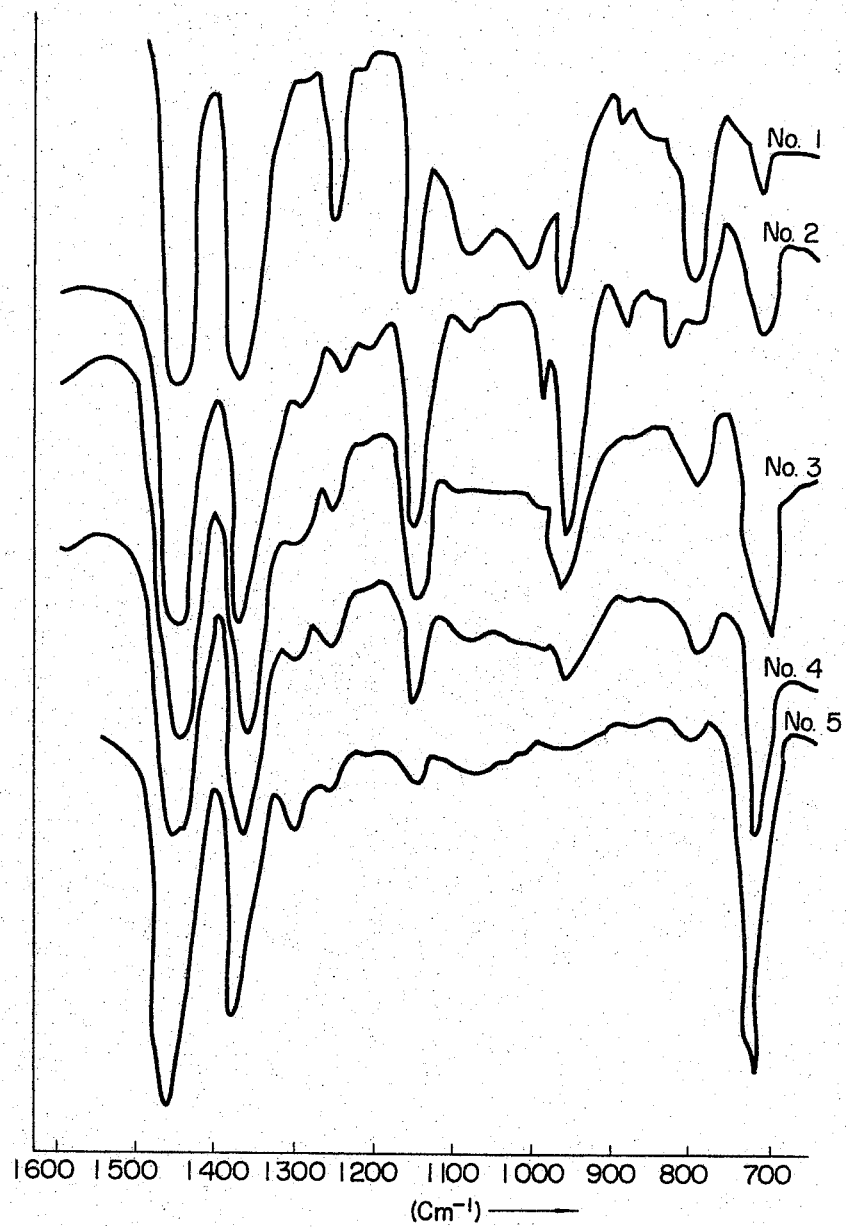

3,336,277
PROCESS FOR THE PRODUCTION OF RUBBERY COPOLYMERS
Masao Iwamoto and Sadao Yuguchi, Ohtsu-shi, Japan, assignors to Toyo Rayon Kabushiki Kaisha, Chuo-ku, Tokyo, Japan, a corporation of Japan
Filed Sept. 17, 1964, Ser. No. 397,120
12 Claims. (Cl. 260—80.78)

This invention relates to a process for producing copolymers having rubbery elasticity and in particular to such a process wherein in producing copolymers in the presence of a catalyst from the combination of olefins such as ethylene and propylene, ethylene and butene–1, propylene, and butene–1, or propylene and isobutylene, or these and dienes, the copolymerization of the foregoing olefins is carried out in an inert organic solvent in the presence of a catalyst obtained by incorporating at least one member of the group consisting of vanadium halides and vanadium oxyhalides to a system consisting of a mixture of an organic aluminum compound and iron acetyl acetonate.

As catalysts to be used in the copolymerization of ethylene and propylene, the catalysts consisting of a combination of vanadium compounds, such as vanadium tetrachloride and vanadyl trichloride, with trialkylaluminum and dialkylaluminum halides have been known as well as many other catalysts. The copolymers obtained by these processes are the random copolymers of ethylene and propylene, which upon vulcanization, occupy a valuable position as a synthetic rubber having such excellent durability as weatherability, acid proof and resistance-to-ageing properties.

Numerous proposals have also been made concerning the production of rubbery copolymers by means of the same catalyst system, such as the copolymers of ethylene, propylene and the dienes or a combination of ethylene or propylene with butene–1.

The Ziegler type catalysts which have been proposed for use hitherto in such copolymerizations were not entirely satisfactory for the following reasons: namely, these catalysts wasted the material propylene for the alkylation of the aromatic type reaction solvents, with the consequence that the reaction could not be carried out smoothly; or, as hereinafter indicated, they were unsuitable for producing copolymers having good uniformity; or further, if attempts were made in this case to improve the uniformity of the polymer by a selection of the organic aluminum compound, those having a relatively low molecular weight were only obtained.

Upon furthering our researches for a process by which these rubbery copolymers could be produced with still greater advantage commercially with a much more improved catalytic activity, we found that the aforementioned defects could be satisfactorily surmounted by using during the copolymerization of the hereinabove mentioned olefins a three-component system catalyst comprising a vanadium compound and an organic aluminum compound chosen from the conventional Ziegler type catalysts and, besides these, iron acetyl acetonate.

Further, in this case, by carrying out the copolymerization reaction in the presence of a catalyst system obtained by first mixing an organic aluminum compound with iron acetyl acetonate and then adding to this system at least one of the vanadium compounds, particularly vanadium halides or vanadium oxyhalides, it was found that the copolymerization reaction could be carried out with a greatly improved catalytic activity.

It was further found that the resulting copolymer could be vulcanized with peroxides or sulfur and that an excellent synthetic rubber was thus provided.

It is therefore an object of the present invention to provide a process wherein, in producing in the presence of a catalyst copolymers consisting of the combinations of olefins, such as ethylene and propylene, ethylene and butene–1, propylene and butene–1 and also those of three components consisting of the foregoing combinations to which has also been added a diene, the defects of the conventional Ziegler type catalysts have been surmounted and rubbery copolymers are produced commercially to advantage with excellent catalytic activity.

Other objects and advantages of the invention will be apparent from the description which follows.

The starting materials used in the invention include the following preferred combinations of olefins, such as ethylene and butene–1, propylene and butene–1, and propylene and isobutylene, as well as the combination of the foregoing with dienes, namely, ethylene, propylene and a diene; ethylene, butene–1 and a diene; propylene, butene–1 and a diene; and propylene, isobutylene and a diene. As the dienes for improving the vulcanizability of the resulting copolymers when copolymerizing the olefins, the known dienes can be used.

As such dienes, included are, e.g., 1,4-pentadiene, 1,5-hexadiene, 1,5-cyclooctadiene, 4-vinylcyclohexene and dicyclopentadiene.

As previously indicated, the catalyst used in the invention process is obtained by mixing the following three components, namely:

Component A: Organic aluminum compound.
Component B: Iron acetyl acetonate.
Component C: At least one member selected from vanadium halides and vanadium oxyhalides.

In mixing these three components, first component A and component B are mixed and then component C is added. The catalyst, mixed in the foregoing sequence, may be charged to the reaction zone, or a mixture of components A and B may be first charged to the reaction zone after which component C is added, or the desired catalyst system may be made in the reaction zone by adding the components in the foregoing sequence. In any event, in accordance with the invention process, the reaction must be carried out in the presence of a catalyst system that is formed by mixing the aforesaid components A, B and C in the foregoing sequence. Needless to say, there is no sequential priority as to the order in which components A and B are added. Further, these components may be mixed in the solvent, i.e., the inert organic solvent solution which is normally the reaction medium.

The aluminum compounds, the foregoing compent A, include the compounds of the formula $AlR_3\text{-}nXn$, wherein $n$ is 0, 1 or 2, R is alkyl, X is hydrogen or halogen, such as, e.g., trimethylaluminum, triethylaluminum, diethylaluminum chloride, triisopropylaluminum, tri(n-propyl)aluminum, tri(n-butyl) aluminum, di-(n-butyl) aluminum bromide, trisobutylaluminum, diisobutylaluminum hydride, tri(n-hexyl) aluminum and tri(n-octyl) aluminum.

Iron acetyl acetonate, the component B, is obtained by reacting ferric chloride with acetyl acetone in an inert hydrocarbon solvent such as benzene.

As the halogens of the vanadium halides and oxyhalides, chlorine, bromine and iodine are included, chlorine being especially preferred according to this invention.

As such vanadium halides can be mentioned vanadium trichloride and vanadium tetrachloride, while as vanadium oxyhalides there is vanadium oxychloride.

Accordingly, the combination which manifests especially conspicuous catalytic activity and is most desirable for overcoming the disadvantages of the conventional Ziegler type catalyst and carrying out the copolymerization commercially to advantage is one in which the choice of the components are made from the following compounds; namely, as component A, triethylaluminum, triisopropylaluminum, triisobutylaluminum or trihexylaluminum; as component B, iron acetyl acetonate; and as component C, either vanadium trichloride, vanadium tetrachloride or vanadium oxychloride.

In the hereinabove described catalyst system as used in the present invention, the molar ratio of the vanadium halide to the organic aluminum compound may be 1:1 or more, as in the case of the hitherto used Ziegler type catalyst, but even a smaller ratio can be used. The amount used of the iron acetyl acetonate, on the other hand, is generally effective even when used in small amounts as compared with the other components, an amount less than the equimolar amount, based on the vanadium halide, being sufficient. This also holds true when the vanadium compound is a vanadium oxychloride.

For example, letting Al represents the aluminum compound, V, the vanadium compound and Fe, the iron acetyl acetonate, then when the molar ratio Al/V is maintained between 1.5 and 2.5, the polymerization reaction takes place favorably if the molar ratio Fe/V is not more than 0.5, and preferably not more than 0.25.

A comparison will be made between the hereinabove described catalyst system as used in the invention process with the prior art catalysts. In the case of the prior art Ziegler type catalysts, if, for example, $VCl_4$ or $VOCl_3$ and $AlR_3$ (R=alkyl) is used as the catalyst, the composition of the product is nonuniform and a tendency to formation of homopolymers take place when the alkyl radical is not large. Thus it is impossible to obtain satisfactory copolymers. On the other hand, if an attempt is made to improve the uniformity of the polymer by using in this case $IlR_2X$ )R=alkyl, X=halogen) instead of the $AlR_3$, only copolymers of relatively low molecular weight can be obtained. It is particularly impossible to form copolymers in an aromatic hydrocarbon solvent such as benzene by using these prior art catalysts. Also, if $AlRX_2$ is used as the organic aluminum compound, then as in the case of the foregoing catalyst system, the aromatic hydrocarbons such as benzenes cannot be used. On the other hand, the invention process is an improvement in the process of using these prior art catalysts. Hence, even when $AlR_3$ is used as the aforesaid component A in the catalyst according to the invention process, copolymers of good uniformity can be obtained. Further, it becomes possible to use the aromatic hydrocarbons such as benzene as the solvent. In addition, when using propylene as one of the components of the copolymerization in such a solvent, its reactivity is also high, since the propylene is not wasted in the alkylation of the reaction medium as in the case with the prior art catalyst system. Thus the copolymerization reaction proceeds smoothly and effectively. This is likewise true in the case of butene-1.

As described hereinabove, according to the process of this invention, the copolymerization reaction is carried out using a catalyst. In conducting the reaction, there are no special restrictions as to the polymerization temperature and pressure, it being possible to employ a wide range of reaction conditions. Normally, however, the reaction is carried out within a temperature range of from —50° to 200° C. and a pressure of about 0 to 100 kg./cm.$^2$ gauge. The reaction is conveniently carried out by contacting the copolymerization components with the aforementioned catalyst system in an inert organic solvent.

While the polymerization is generally carried out in an inert solvent such as the nonpolymerizable hydrocarbons and chlorinated hydrocarbons, especially to be preferred are the aromatic hydrocarbons such as benzene, toluene, xylene, ethylbenzene and tetrahydronaphthalene. Also desirable are the halogenated aliphatic hydrocarbons such as ethylene chloride.

The copolymer obtained by the invention process can be mixed and kneaded with carbon black and the other ingredients that are normally used for vulcanizing and then can be made into a tough rubber by vulcanizing with peroxides or sulfur.

In introducing the material gas when carrying out the polymerization reaction, any of the procedures normally used when reacting gaseous reaction components in the liquid phase can be employed. For attaining the highest efficiency, the gas mixed in the prescribed ratio is preferably blown into the liquid phase at a prescribed rate and the dissolution and diffusion of the gas effected as expeditiously as possible by stirring the liquid phase thoroughly. In order to preclude the rate at which the gas dissolves and diffuses from becoming the limiting factor of the reaction, the rate of feed must be high. Since the composition of the exhaust gas becomes constant when the state at which the reaction proceeds becomes steady, the gas can be replenished of its deficiency and recycled to its original reservoir to be reused.

Further, as is apparent from the hereinafter given examples, the catalyst used in the invention process effectively manifests its activity with respect to a wide range in the molar ratio of the material composition. The molar ratio in which the material gases are mixed for obtaining a copolymer of the desired composition can be readily determined by experimentation. The catalyst system used in the invention process differs from the two-component system catalyst that was hitherto used in this type of reaction in that it is featured by the fact that the reaction components present in a lesser amount participates to a greater degree in the copolymer. Hence, the mixed gas for about 60% propylene which was hitherto required for obtaining an ethylene-propylene copolymer of 65–70% ethylene composition need only be one of 20–30% propylene content according to the present invention, thus making it unnecessary to mix in and pass a great amount of propylene.

For a clearer understanding of the invention the following examples are given. The ethylene content of a copolymer of ethylene with butene-1 was obtained by measuring the infrared absorption spectrum and then calculated by means of the following equation using the absorptions at 720 cm.$^{-1}$ and 770 cm.$^{-1}$.

$$\text{ethylene (mol percent)} = \frac{0.472I}{0.472I + 1} \times 100$$

where $I = \log D720/\log D770$

On the other hand, the propylene content of an ethylene-propylene copolymer was measured from the ratio of adsorbance of an infrared ray at 720 cm.$^{-1}$ and 1150 cm.$^{-1}$ by means of a calibration curve described in H. V. Drushel, F. A. Iddings, Anal. Chem. 35 28 (1963).

*Example 1*

A four-necked 500 cc. flask was equipped with a stirrer, a reflux condenser, a gas inlet line and a thermometer. Using 300 cc. of benzene as the solvent, as the catalyst were added 0.175 g. of iron acetyl acetonate, 1 cc. of triethylaluminum and 4 mmols of vanadium tetrachloride, in the order given, after which an ethylene-propylene mixed gas was immediately introduced. After carrying out the reaction for 1 hour at 50° C., the results shown in Table I below were obtained. The rate of flow of the ethylene-propylene mixed gas was 300 cc./min.

TABLE I

| No. | Ethylene/Propylene, vol. ratio | Weight of Product, g. | Crude Product $C_3$ content, mol percent | n-Hexane Extracted Portion, wt. percent | 135° C. ($\eta$) Tetralin |
|---|---|---|---|---|---|
| 1 | 1/5 | 12.7 | ca. 82 | ca. 85 | 3.63 |
| 2 | 1/2 | 22 | 70 | 71.6 | |
| 3 | 1/1 | 24 | 51 | 52.5 | 3.91 |
| 4 | 2/1 | 25.5 | 44 | 47.5 | 3.25 |
| 5 | 5/1 | 36.2 | 17 | 39.3 | 2.75 |

The infrared absorption spectra of the crude polymer obtained are shown in FIG. 1 of the accompanying drawings. In the figure, on the horizontal axis are indicated the wave length (cm.$^{-1}$), and curves Nos. 1–5 correspond respectively with Nos. 1–5 of Table I, above. As is apparent from Table I and FIG. 1, it is possible according to the invention process to obtain copolymers over a wide range of the propylene mixture ratios. The uniformity of the copolymer becomes greater as its mixture ratio approaches 1. In 1:1 mixture the ratio of composition is also close to 1. In addition, it is apparent that copolymers of high molecular weight can be readily obtained.

The n-hexane extractions were in all cases capable of forming a tough rubber by vulcanizing with peroxides.

Example 2

The copolymerization reaction was carried out as in Example 1 by blowing an ethylene-propylene (1:1) mixed gas into the reaction system at a reaction temperature of 15–20° C. There was obtained 30 g. of the copolymer. The $C_3$ percent of the copolymer obtained was 68 mol percent and it was thus shown that a greater amount of propylene had been copolymerized than when the reaction was carried out at 50° C. Practically all of the production was completely soluble in n-heptane. When 10 parts of this polymer were compounded with 5 parts of carbon, 0.56 part of sulfur and 0.52 part of dicumyl peroxide and then vulcanized for 1 hour at 160° C. under a pressure of 250 kg./cm.$^2$, it exhibited a tensile strength of 162 kg./cm.$^2$-g., a 300% modulus of 73.3 kg./cm.$^2$-g. and an elongation of 405%.

Example 3

The copolymerization reaction was carried out as in Example 1 by blowing in an ethylene-propylene (1:2) mixed gas at a reaction temperature ca. 0° C. and 28 g. of polymer was obtained one hour later. 71.6 wt. percent of this polymer was soluble in ether, and the $C_3$ content of this ether-soluble portion was 58 mol percent. The remainder was completely soluble in n-heptane, and the $C_3$ content of this n-heptane-soluble portion was 51.5%. When the same reaction was carried out in an n-heptane solvent, one hour later 15 g. of polymer were formed whose ether extraction portion was 3.4% while all the remainder was an n-heptane extraction portion, the $C_3$ content being 34.5%.

The amount of polymer formation according to the catalyst-solvent system of the present invention is great and its propylene copolymerizability is high.

Example 4

Five g. of dicyclopentadiene were added dropwise to the system under identical conditions as in Example 1 and after 1 hour and 25 minutes, 18.7 g. of polymer were obtained. The propylene content of the copolymer obtained was as indicated below.

|  | Mol percent |
|---|---|
| Propylene content of the crude polymer | 51.5 |
| Propylene content of the n-heptane-soluble portion | 50 |
| Propylene content of the residue after extraction with n-heptane | 50 |

The uniformity of the composition of the polymer obtained in this case was very good.

The n-heptane soluble portions was 80% by weight.

A test was conducted of the n-heptane portion which was vulcanized with sulfur. The tensile strength of the polymer at about its semivulcanized state was 49.2 kg./cm.$^2$-g. and its elongation was 225%.

Example 5

The reaction was carried out as in Example 1 except that 10 cc. 1,5-cyclooctadiene were added with the benzene solvent to obtain 14.5 g. of polymer. The propylene content was 51%. In a test conducted after vulcanizing with sulfur, the polymer exhibited a tensile strength of 52.3 kg./cm.$^2$-g., a 300% modulus of 49.0 kg./cm.$^2$-g., an elongation of 350% and a hardness of 73.

Example 6

Using toluene as the solvent, the reactions were carried out for 20 minutes while introducing ethylene at the rate of 2000 cc./min. and propylene at the rate of 1000 cc./min. and varying the amount of 1,5-cyclooctanediene. The results thereby obtained are shown in Table II, below. The iodine value was measured by the Wijs method, while the tensile strength, modulus and elongation were determined in accordance with JIS K–6301 and JIS K–6351.

TABLE II

| No. | Amount Added of 1,5-Cyclo-octadiene, cc. | Amount of Polymer Formed, g. | Crude Product | | Properties of Sulfur-Vulcanized Product | | |
|---|---|---|---|---|---|---|---|
| | | | Iodine Value | Propylene Content, mol percent | Tensile Strength, kg./cm.$^2$-g. | 300% Modulus, kg./cm.$^2$-g. | Elongation, percent |
| 1 | 12 | 18.4 | 4.42 | 40.5 | 86.0 | 84.0 | 325 |
| 2 | 9 | 19.4 | 3.69 | 40.5 | 76.9 | 78.9 | 300 |
| 3 | 6 | 19.8 | 2.85 | 42.3 | 67.9 | 63.2 | 330 |
| 4 | 3 | 21.5 | 3.65 | 43.8 | 52.8 | 40.4 | 600 |

Example 7

The reactions were carried out under identical conditions as in Example 1 by adding 12 cc. of cyclooctadiene and 300 cc. of toluene while varying the ratio at which the introduction of ethylene and propylene were made at a reaction temperature of −10° C. The results thereby obtained are shown in Table III, below.

TABLE III

| No. | Ethylene/ Propylene | Weight of Product, g. | Crude Product | | Sulfur-Vulcanized Product | | |
|---|---|---|---|---|---|---|---|
| | | | Iodine Value | Propylene Content, mol percent | Tensile Strength, kg./cm.$^2$-g. | 300% Modulus, kg./cm.$^2$-g. | Elongation Percent |
| 1 | 2 | 18.42 | 4.42 | 40.5 | 86.0 | 84.0 | 325 |
| 2 | 7/5 | 20.95 |  | 45.5 | 101.0 |  | 295 |
| 3 | 1 | 19.30 |  | 56.2 | 105.0 | 42.3 | 740 |

Examples 8–13

To a four-necked 500-cc. flask equipped with a stirrer, a reflux condenser, a thermometer and a gas inlet line were added 300 cc. of toluene, and after replacing the system completely with nitrogen, it was then replaced with the ethylene-propylene mixed gas to be used for the reaction. 0.175 g. (0.5 mmol.) of iron acetyl acetonate, 1 cc. (7.34 mmols.) of triethylaluminum and 0.4 cc. (4 mmols.) of vanadium oxychloride, in the order given, were all added without diluting in a solvent, following which the ethylene-propylene mixed gas was introduced for 15 minutes at the rate of 1 liter/minute at the temperatures prescribed. The results obtained are shown in Table IV.

TABLE IV

| Example | Reaction Temperature, °C. | Propylene in the Mixed Gas, mol percent | Weight of Resulting Copolymer, g. | Propylene in the Copolymer, mol percent |
|---|---|---|---|---|
| 8 | −20 | 52 | 14.6 | 54.2 |
| 9 | 0 | 53.7 | 11.0 | 45.5 |
| 10 | 20 | 50.0 | 9.8 | 44.4 |
| 11 | 50 | 54.6 | 8.2 | 50.7 |
| 12 | 80 | 54.1 | 5.9 | 38.2 |
| 13 | 100 | 54.6 | 3.5 | 16.5 |

All of the copolymers obtained were soluble in n-heptane up to 85–95%. Further, when they were vulcanized with a peroxide, rubbery substances resulted. For example, from the crude product of Example 11, there was obtained a rubbery substance having a tensile strength of 118.8 kg./cm.$^2$-g., a 300% modulus of 83.7 kg./cm.$^2$-g. and an elongation of 375%.

Examples 14–18

Figure 2:
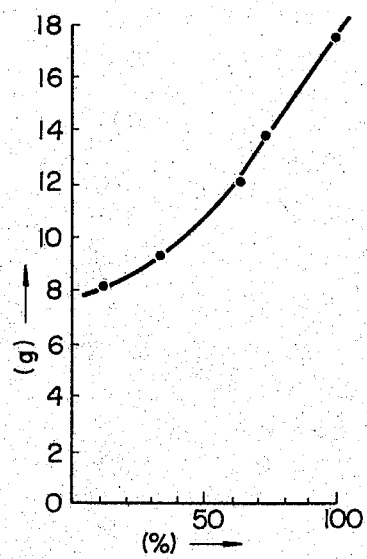
Figure 3:
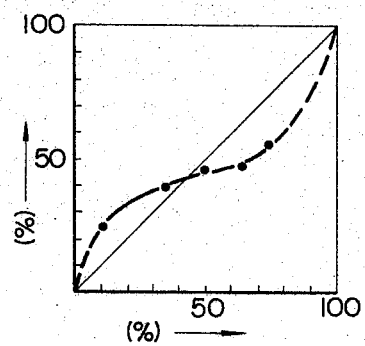

The same apparatus as employed in Examples 8–13 was charged simultaneously with the solvent and catalyst, following which four types of gases of differing proportions of composition were used and the reactions were carried out on each occasion for 15 minutes at 20° C., the rate of the gas flow being 1 liter/minute. The results obtained with respect to the amount of product formed and the composition thereof are compared in Table V. The relationship between the proportions of ethylene in the mixed gases and the yields is shown in FIG. 2. In the figure, the vertical axis represents the yields (g.) of copolymers while the horizontal axis shows the proportions (mol. percent) of ethylene. The relationship between the proportions (mol. percent) of ethylene in the gases and the proportions (mol. percent) of ethylene in the copolymers is shown in FIG. 3, the vertical axis showing the ethylene contents of the copolymers and the horizontal axis showing the ethylene contents of the mixed gases.

TABLE V

| Example | Ethylene in Mixed Gas, mol percnet | Yield, g. | Ethylene in Copolymer, mol percent |
|---|---|---|---|
| 14 | 10.2 | 8.2 | 26 |
| 15 | 34.4 | 9.4 | 39.6 |
| 16 | 50 | 9.8 | 49.3 |
| 17 | 62.6 | 12.2 | 48.8 |
| 18 | 83.8 | 13.9 | 55.5 |

These copolymers could also be vulcanized with peroxides. For example, the copolymer obtained in Example 15 was vulcanized in the following manner.

Ingredients compounded: G.
  Polymer _____ 7
  Carbon _____ 3.5
  Dicumyl peroxide _____ 0.364
  Sulfur _____ 0.039

Vulcanizing conditions:
  250 kg./cm.$^2$-g., 160° C., 45 minutes.

Properties of vulcanized product:
  Tensile strength _____ kg./cm.$^2$__ 189.9
  300% modulus _____ do____ 109.1
  Elongation _____ percent__ 420
  Hardness _____ 66.5

Example 19

Employing the same apparatus as in Examples 8–13 and as the solvent n-heptane, an ethylene-propylene mixed gas (43 mol percent ethylene) was introduced at the rate of 1 liter per minute for 15 minutes at 20° C. to obtain 11 g. of a copolymer, the propylene content of which was 56 mol percent. After extracting with n-heptane, the extract was vulcanized with a peroxide. A rubbery elastomer having a tensile strength of 110.8 kg./cm.$^2$-g. and an elongation of 435% was obtained.

Example 20

To a system to which was being introduced an ethylene-propylene mixed gas under identical conditions as in Examples 8–13 were added drop-wise 5 g. of 1,5-cyclo-octadiene. When the reaction was thus carried out for 20 minutes at 20° C., 10.2 g. of a polymer were obtained.

Examples 21–23

Employing the same apparatus as in Example 1 and, as the solvent, 300 cc. of toluene, the copolymerization of ethylene and propylene was carried out while varying the concentration of the catalyst. Adding as the catalyst iron acetyl acetone, triethylaluminum and vanadium tetrachloride, in the order given, the reaction was carried out by immediately introducing an ethylene-propylene (71.6 mol percent ethylene) mixed gas at the rate of 750 cc./min. for 30 minutes at 20° C. The results thereby obtained are shown in Table VI, below. The molar ratio of the three components of the catalyst was maintained in this case as follows: Fe:Al:V=1:12:8.

TABLE VI

| Example | Concentration of VCl$_4$, mmol/l. | Amount Formed of Copolymer, g. | 135° C. ($\eta$) Tetralin |
|---|---|---|---|
| 21 | 3.2 | 26.7 | 3.2 |
| 22 | 0.8 | 21.8 | 4.0 |
| 23 | 0.4 | 20.2 | 5.2 |

Examples 24–27

For investigating the uniformity of the catalytic activity of the invention process, an experiment was conducted employing the same apparatus as in Example 1. The three catalyst components of iron acetyl acetonate, triethylaluminum and vanadium tetrachloride maintained in a molar ratio of 0.5:7.3:4 (the concentration of the vanadium tetrachloride being 12 mmol./l.) were mixed, in the order given, in an atmosphere of an ethylene-propylene mixed gas. This mixed catalyst was then maintained for prescribed periods of time at 20° C., after which it was used as catalyst and the reaction was carried out for 15 minutes at 20° C. by introducing an ethylene-propylene mixed gas (57.2 mol percent ethylene) at the rate of 1 liter/minute. The results thus obtained are shown in Table VII, below.

TABLE VII

| Example | Ageing Time, min. | Amount of Copolymer Formed, g. | Ethylene in Copolymer, mol percent | 135° C. ($\eta$) Tetralin |
|---|---|---|---|---|
| 24 | 5 | 14.2 | 50.5 | 3.40 |
| 25 | 15 | 19.0 | 50.6 | 3.59 |
| 26 | 30 | 18.2 | 49.3 | 4.15 |
| 27 | 60 | 24.1 | 49.7 | 3.78 |

When the composition of the copolymers were sought from infrared absorption spectra, it was completely constant within the range of allowable error of calibration curve (±4%).

*Example 28*

Employing the same reaction apparatus as in Example 1 and, as the solvent, 270 cc. of toluene, 30 cc. of 4-vinylcyclohexane were mixed as the third component of the copolymer. As the catalyst, iron acetyl acetonate, triethylaluminum and vanadium tetrachloride were added in a molar ratio of 0.5:7.3:4 (the vanadium tetrachloride added being 4 mmols, following which 30 liters of an ethylene-propylene mixed gas (ethylene 60.6%), while being maintained at 0° C., were introduced to the reactor in 25 minutes to obtain 10.8 g. of copolymer.

Ten parts of the copolymer compounded with 5 parts of carbon black, 0.1 part of sulfur, 0.5 part of zinc oxide and 0.15 part of a vulcanizing accelerator were vulcanized for 1 hour at 160° C. and a pressure of 250 kg./cm.$^2$-g. The so obtained copolymer exhibited a tensile strength of 120 kg./cm.$^2$-g., an elongation of 540%, a 300% modulus of 80.4 kg./cm.$^2$-g.

*Examples 29–33*

A four-necked 500-cc. flask was equipped with a stirrer, a thermometer, a reflux condenser and an inlet for blowing in a mixed gas of ethylene and butene–1, to which flask was then added 300 cc. of benezene as the solvent. After replacing the inside of the system with nitrogen, the system inclusive of the solvent was replaced with an ethylene-butene–1 gas, after which this gas was continued to be blown in. Iron acetyl acetonate, triethylalminum and vanadium tetrachloride were then added, in the order given, to the reaction system at a molar ratio of 1:12:8 (8 mmols of the vanadium tetrachloride being used.)

The ethylene-butene–1 mixed gas was introduced for 2 hours at the rate of 300 cc./min. while maintaining the reaction temperature at 15° C. The results thus obtained are shown in Table VIII, below.

TABLE VIII

| Example | Ethylene in the Mixed Gas, vol. percent | Amount of Ethylene-Butene-1 Copolymer Formed, g. | n-Heptane Soluble Portion of Copolymer, wt. percent | Ethylene Content, mol percent |
|---|---|---|---|---|
| 29 | 16.6 | 17.8 | 51.4 | 30 |
| 30 | 33.3 | 20.8 | 57.2 | 36 |
| 31 | 50 | 29.5 | 51.7 | 47 |
| 32 | 66.6 | 28.3 | 75.0 |  |
| 33 | 83.4 | 31.5 | 47.5 | 66 |

*Examples 34 and 35*

Tens parts of the copolymers obtained in Examples 30 and 31 were compounded with 5 parts of carbon black, 0.52 part of a peroxide and 0.056 part of sulfur, after which they were vulcanized for 45 minutes at 160° C. and a pressure of 250 kg./cm.$^2$-g.

The so obtained ethylene-butene–1 copolymeric rubbers exhibited tensile strengths of 130.2 kg./cm.$^2$-g. and 126.3 kg./cm.$^2$-g., respectively.

*Example 36*

The solvent and catalyst were charged to the flask as in Examples 29–33. In the solvent there was dissolved 10 cc. of cyclooctadiene.

An ethylene-butene–1 (1:1) mixed gas was introduced at the rate of 300 cc./min. for 2 hours while maintaining its temperature at 10° C. 3.5 g. of the product was obtained, of which 66% were soluble in n-heptane.

Ten parts of this n-heptane-soluble portion was compounded with 5 parts of carbon black, 0.1 part of sulfur, 0.5 part of zinc oxide and 0.15 part of a vulcanizing accelerator and vulcanized for 1 hour at 160° C. under a pressure of 250 kg./cm.$^2$-g. The resulting vulcanized rubbery copolymer had a tensile strength of 51.1 kg./cm.$^2$-g. and an elongation of 425%.

*Examples 37–41*

Employing the same procedures as described in Examples 29–33 and, instead of the ethylene-butene–1 mixed gas, a propylene-butene–1 mixed gas being used, the copolymerization of propylene and butene–1 was carried out with the results shown in Table IX, below.

TABLE IX

| Example | Propylene in the Mixed Gas, vol. percent | Amount of Propylene-Butene-1 Copolymer Formed, g. | n-Hexane Soluble Portion, wt. Percent |
|---|---|---|---|
| 37 | 16.6 | 8.9 | 88.3 |
| 38 | 33.3 | 6.9 | 98.4 |
| 39 | 50 | 6.6 | 88.4 |
| 40 | 66.6 | 6.8 | 83.2 |
| 41 | 83.4 | 8.6 | 97.7 |

Figure 4:
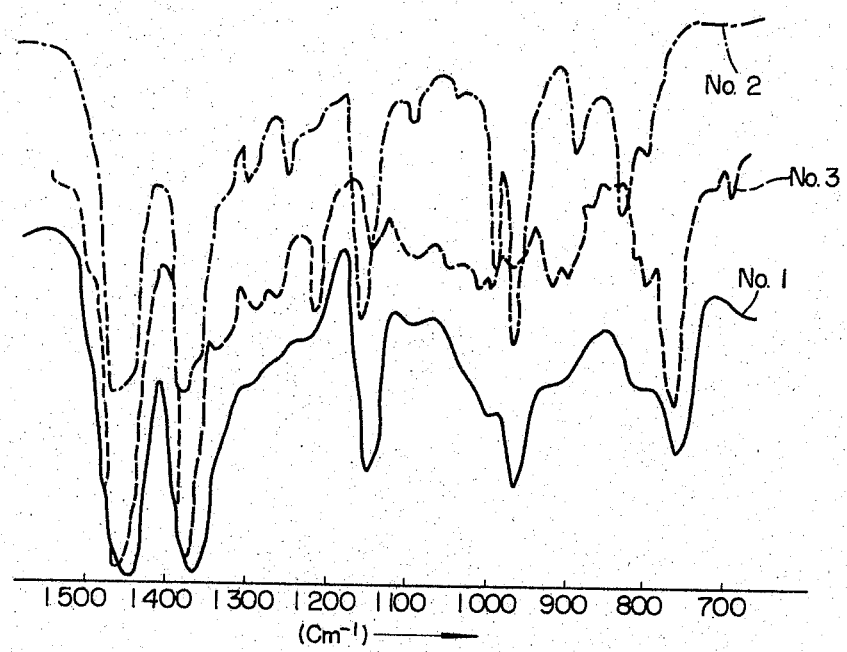

All of the products had rubbery elasticity. The infrared absorption spectrum of the product obtained in Example 39 is shown in FIG. 4. In the figure, curve No. 1 is that of Example 39, while curve No. 2 is that of a propylene homopolymer and curve No. 3 is that of a butene–1 homopolymer. As is apparent when these curves are compared, the propylene-butene–1 copolymer formed an infrared absorption spectrum differing from both that of polypropylene and polybutene–1.

*Example 42*

Figure 5:
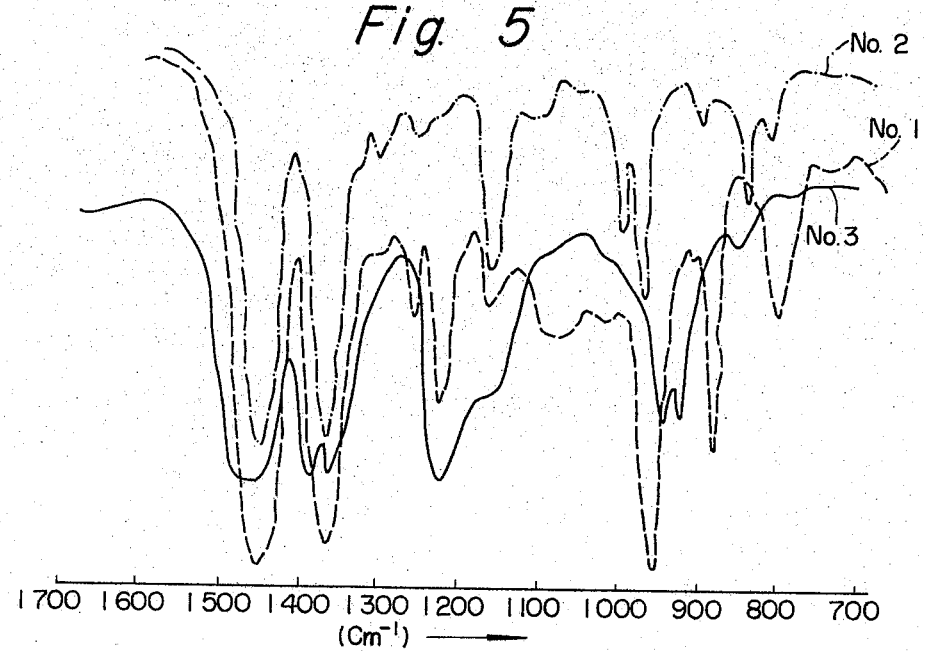

To a 200 cc. pressure reactor charged with 50 cc. of toluene were added 0.35 g. of iron acetyl acetonate, 1 cc. of triethylaluminum and 4 mmols of vanadium tetrachloride. Then 30 cc. of isobutylene and 30 cc. of propylene which were both liquefied were added. The reaction was stopped after stirring for 1.5 hours at −20° C. 3.3 g. of a yellowish-brown, somewhat soft, solid product was obtained. The infrared absorption spectrum of this copolymer is shown in FIG. 5. In the figure, curve No. 1 is that of Example 42, while curve No. 2 is that of a propylene homopolymer and curve No. 3 is that of isobutylene homopolymer. As is apparent when these curves are compared, it is definite that the infrared absorption spectrum of the propylene-isobutylene copolymer differs completely from that either the polypropylene or isobutylene.

What we claim is:

1. In a process for producing a compolymer from a combination of olefins which is one selected from the group consisting of the combination of ethylene and propylene, ethylene and butene–1, propylene and butene–1, and propylene and isobutylene, in the presence of a catalyst, the improvement which comprises effecting the copolymerization reaction of said olefins in an inert organic solvent in the presence of a catalyst obtained by first mixing an organic aluminum compound with iron acetyl acetonate and then adding at least one vanadium oxyhalide.

2. The process according to claim 1 wherein the molar ratio of said organic aluminum compound to said vanadium oxyhalide ranges from 1.5 to 2.5 and the molar ratio of said iron acetyl acetonate to said vanadium compound is not more than 0.5.

3. The process according to claim 1 wherein said inert solvent is an aromatic hydrocarbon.

4. In a process for producing a copolymer from a combination of olefins which is one selected from the group consisting of the combination of ethylene, propylene and a nonconjugated diene; and ethylene, butene–1 and a nonconjugated diene, in the presence of a catalyst, the improvement which comprises effecting the copolymerization reaction of said olefins in an inert organic solvent in the presence of a catalyst obtained by first mixing an organic aluminum compound with iron acetyl acetonate and then adding at least one vanadium oxyhalide.

5. The process according to claim 4 wherein the molar ratio of said organic aluminum compound to said vanadium oxyhalide ranges from 1.5 to 2.5 and the molar ratio of said iron acetyl acetonate to said vanadium compound is not more than 0.5.

6. The process according to claim 4 wherein said inert solvent is an aromatic hydrocarbon.

7. The process according to claim 3 wherein said aromatic hydrocarbon is a member selected from the group consisting of benzene, toluene, xylene, ethylbenzene and tetrahydronaphthalene.

8. The process according to claim 6 wherein said aromatic hydrocarbon is a member selected from the group consisting of benzene, toluene, xylene, ethylbenzene and tetrahydronaphthalene.

9. The process according to claim 1 wherein said inert solvent is ethylene chloride.

10. The process according to claim 4 wherein said inert solvent is ethylene chloride.

11. The process according to claim 1 wherein said copolymerization reaction is effected at a temperature ranging from −50° to 150° C. and a pressure ranging from zero to 100 kilograms per square centimeter gauge.

12. The process according to claims 1 and 4 wherein said copolymerization reaction is effected at a temperature ranging from −50° to 150° C. and a pressure ranging from zero to 100 kilograms per square centimeter gauge.

References Cited

FOREIGN PATENTS

| | | |
|---|---|---|
| 857,938 | 1/1961 | Great Britain. |
| 875,924 | 8/1961 | Great Britain. |

JOSEPH L. SCHOFER, *Primary Examiner.*

M. B. KURTZMAN, *Assistant Examiner.*